US012779680B2

(12) United States Patent
Spenninger et al.

(10) Patent No.: US 12,779,680 B2
(45) Date of Patent: Nov. 3, 2026

(54) TEACHING IN A HOLDING FORCE FOR AN OBJECT IN A ROBOTIC GRIPPER

(71) Applicant: FRANKA EMIKA GMBH, Munich (DE)

(72) Inventors: Andreas Spenninger, Karlsfeld (DE); Tim Rokahr, Munich (DE); Dmitriy Shingarey, Munich (DE)

(73) Assignee: FRANKA EMIKA GMBH, Munich (DE)

( * ) Notice: Subject to any disclaimer, the term of this patent is extended or adjusted under 35 U.S.C. 154(b) by 518 days.

(21) Appl. No.: 17/442,883

(22) PCT Filed: Mar. 19, 2020

(86) PCT No.: PCT/EP2020/057578

§ 371 (c)(1),
(2) Date: Sep. 24, 2021

(87) PCT Pub. No.: WO2020/193352

PCT Pub. Date: Oct. 1, 2020

(65) Prior Publication Data

US 2022/0152820 A1 May 19, 2022

(30) Foreign Application Priority Data

Mar. 28, 2019 (DE) ..................... 10 2019 107 975.6

(51) Int. Cl.
*B25J 9/16* (2006.01)

(52) U.S. Cl.
CPC ............. *B25J 9/1633* (2013.01); *B25J 9/163* (2013.01)

(58) Field of Classification Search
CPC . B25J 9/1633; B25J 9/163; B25J 9/104; B25J 9/1045; B25J 9/1615; B25J 9/1612
See application file for complete search history.

(56) References Cited

U.S. PATENT DOCUMENTS 9,919,424 B1 * 3/2018 Devengenzo ............ B25J 15/02
2010/0312392 A1 12/2010 Zimmermann
(Continued)

FOREIGN PATENT DOCUMENTS

DE 102007062108 A1 7/2009
DE 102012111701 A1 6/2014
(Continued)

OTHER PUBLICATIONS

WIPO English translation of JP-2001277175-A. (Year: 2001).*
(Continued)

*Primary Examiner* — Christopher A Buksa
(74) *Attorney, Agent, or Firm* — Hoffmann & Baron, LLP

(57) ABSTRACT

A method of teaching in a holding force for holding an object by a gripper of a robot manipulator, the gripper having gripper jaws elastically deformable in a reversible manner, the method including: closing the gripper until the gripper jaws contact the object at contact points of the gripper jaws; externally applying a desired closing force at connection points of the gripper jaws to gripper jaw bearings such that the connection points move relative to the contact points, thereby elastically deforming the gripper jaws; actuating a gripper drive to maintain the current position of the connection points and terminating the closing force externally applied onto the connection points; and ascertaining and storing a value of a gripping force or a gripping torque, wherein the gripping force or the gripping torque is produced by elastic deformation of the gripper jaws and is exerted onto the connection points by the gripper jaws.

18 Claims, 2 Drawing Sheets

(56) References Cited

U.S. PATENT DOCUMENTS

| | | | | |
|---|---|---|---|---|
| 2016/0059407 | A1 | 3/2016 | Sonoda | |
| 2018/0126551 | A1* | 5/2018 | Amano | B25J 15/08 |
| 2019/0248006 | A1* | 8/2019 | Takahashi | B25J 13/085 |
| 2020/0290196 | A1 | 9/2020 | Bohme et al. | |

FOREIGN PATENT DOCUMENTS

| | | | | | |
|---|---|---|---|---|---|
| DE | 102016200495 | A1 | | 7/2017 | |
| DE | 102016208362 | A1 | | 11/2017 | |
| DE | 102016111173 | A1 | | 12/2017 | |
| DE | 102017201057 | A1 | | 7/2018 | |
| DE | 102017124356 | B3 | | 12/2018 | |
| DE | 102017213824 | A1 | | 2/2019 | |
| JP | 2001277175 | A | * | 10/2001 | A61F 2/583 |
| WO | WO2017/036520 | A1 | | 3/2017 | |

OTHER PUBLICATIONS

English-language translation of International Preliminary Report on Patentability issued in International Application No. PCT/EP2020/057578 on Oct. 7, 2021.

* cited by examiner

TEACHING IN A HOLDING FORCE FOR AN OBJECT IN A ROBOTIC GRIPPER

CROSS-REFERENCE TO RELATED APPLICATIONS

The present application is the U.S. National Phase of PCT/EP2020/057578, filed on 19 Mar. 2020, which claims priority to German Patent Application No. 10 2019 107 975.6, filed on 28 Mar. 2019, the entire contents of which are incorporated herein by reference.

FIELD

The invention relates to a method for teaching in a holding force for holding an object by a gripper of a robot manipulator and a robot system with a robot manipulator and with a computing unit and with a gripper arranged on the robot manipulator, wherein the robot system is used for teaching in a holding force for holding an object using the gripper of the robot manipulator.

SUMMARY

The object of the invention is to ascertain a holding force for holding an object by a gripper of a robot manipulator.

The invention is defined by the features of the independent claims. Advantageous developments and embodiments are the subject matter of the dependent claims.

A first aspect of the invention relates to a method for teaching in a holding force for holding an object by a gripper of a robot manipulator, the gripper having gripper jaws which are elastically deformable in a reversible manner, the method including:

- closing the gripper until the gripper jaws contact the object at the contact points of the gripper jaws;
- externally applying a desired closing force at connection points of the gripper jaws to gripper jaw bearings, such that the connection points move relative to the contact points, thereby elastically deforming the gripper jaws;
- actuating a gripper drive in order to maintain a current position of the connection points, such that after termination of the closing force as externally applied onto the connection points, the connection points maintain their current position; and
- ascertaining and storing a value of a gripping force or a gripping torque, wherein the gripping force or the gripping torque is produced by the elastic deformation of the gripper jaws and is exerted onto the connection points by the gripper jaws.

The term "which can be elastically deformed in a reversible manner" means that the gripper jaws, like a perfect spring, never dissipate energy during deformation, but can provide it again in a fully reversible manner. During the deformation, a spring force therefore acts against it, and also acts when deforming back into the original shape of the gripper jaws until the original shape is restored. The gripper jaws preferably have a material that can be elastically deformed in a reversible manner and/or a corresponding structure over their entire length, or alternatively, with good approximation, they can be seen as rigid bodies in portions and only certain portions, in particular, portions at their connection points, can be elastically deformed in a reversible manner. These elastic portions can, in particular, be formed by reversibly deformable material, for example, a spring. The effect on the contact points compared to the connection points remains the same in each case.

The gripper preferably has exactly two gripper jaws which are designed to move towards one another in order to close the gripper and, analogously, to move away from one another in order to open the gripper. A gripper drive for maintaining the current position of the connection points is preferably actuated in response to an input by a user. The user preferably first enters the input, whereupon the position of the gripper jaws, in particular, the position of the connection points of the gripper jaws, automatically remains at the current position during the input by a corresponding actuation of the gripper drive, whereby the closing force of the user can be released without the connection points of the gripper jaws moving. With this holding force or with this holding torque, the gripper jaw bearings hold against the spring force which is exerted on the gripper jaw bearings by the reversibly elastically bendable gripper jaws.

At the moment when the application of the external desired closing force onto the connection points of the gripper jaws is terminated, the externally applied desired closing force is therefore replaced by the holding force of the gripper drive for holding the gripper jaw bearings together with the connection points against the spring force of the gripper jaws. Neither the connection points nor other components of the overall system move. Because the originally externally applied closing force is no longer transmitted to the object in the force flow between the connection points via the gripper jaws, but from the contact points of the gripper jaws along the gripper jaws via the connection points of the gripper jaws to the gripper jaw bearings and ultimately also to the gripper drive, in this expanded force flow, the force or the torque that is transmitted from the gripper jaws via the connection points to the gripper jaw bearings up to the gripper drive can in principle be measured at any point. Force sensors and torque sensors are therefore particularly suitable for measuring this gripping torque or this gripping force.

The object is particularly viewed as a rigid body, but it may also show both a completely reversible elastic behavior and a plastic behavior, because this does not prevent the ascertainment of the gripping force and/or the gripping torque. The contact points of the gripper jaws with the object are, in particular, at a free end of the gripper jaws, whereas, in particular, the ends of the gripper jaws opposite the free ends form the connection points of the gripper jaws with the corresponding gripper jaw bearings. The gripper jaws are preferably elongated, wherein when a desired external closing force is applied to the connection points, the gripper jaws are bent about a corresponding transverse axis which is perpendicular to the corresponding longitudinal axis of the gripper jaws. The gripper jaws therefore absorb a bending torque which, however, is available again as a stored spring force when released and can be used to deform the gripper jaws back into the original shape of the gripper jaws. Without friction losses, the closing force ultimately corresponds exactly to the gripping force, or the closing force is transferred to the gripping torque without loss depending on the lever arm under consideration.

It is an advantageous effect of the invention that a user can communicate a desired gripping force of the gripper on an object for holding the object in a robot system by manual force, in particular, with hand force, in a teach-in process without having to enter a numerical value on a device. The reversibly elastic gripper jaws allow direct tactile feedback on the manual force of the user teaching it in, so that the user can set the force by feeling the applied closing force and communicate it to a robot system for storage. This is of particular great advantage if the object that is to remain between the gripper jaws by static friction is an object that can be damaged easily. For example, if the object is a fruit, such as a grape, the object must not be squeezed with excessive force; otherwise it will be damaged. The intuitive gripping of such an object by humans can therefore be transferred directly to the robot manipulator, and in particular, its gripper by the method according to the invention. The teaching in of a gripping force for the robot manipulator continues to take place advantageously in only a very short time.

The use of elasticity in the gripper jaws offers clear advantages over the use of elasticity in the belt or in other parts of the drive train, such as the gearbox. If, in particular, an elastic belt is used instead of or in addition to elastic gripper jaws, the method according to the first aspect of the invention can in principle be carried out without restriction, because in this case too, when a closing force is applied manually, the connection points shift with respect to the contact points of the gripper jaws on the object and against a spring force. In fact, however, the accuracy of the method would suffer disadvantageously and, under certain circumstances, lead to undesirable material fatigue.

According to an advantageous embodiment, the gripper jaw bearings are portions on a closed belt and the connection points of the gripper jaws are belt-side ends of the gripper jaws, wherein the contact points of the gripper jaws with the object are within the region of the free ends of the gripper jaws, the free ends of the gripper jaws and the connection points of the gripper jaws lying opposite one of the gripper jaws along a corresponding longitudinal axis. The belt is, in particular, a toothed belt or a V-belt, wherein the expression "closed belt" means that the beginning and end of the belt are seamlessly connected to one another, so that the belt can run or be driven around one or more belt pulleys.

According to a further advantageous embodiment, the gripping force is ascertained in a force sensor, wherein the force sensor ascertains a force applied to the belt. This is advantageously done by measuring the force on a pulley or by optical means, for example, by interference measurements. The gripping force or the transferred gripping torque transmitted from the gripper jaws to the gripper jaw bearings is therefore advantageously measured directly in the force flow to the gripper drive, which leads to a reliable and precise measurement.

According to a further advantageous embodiment, the gripping force is ascertained in a torque sensor, wherein the torque sensor is arranged on a belt pulley. A belt pulley is used, in particular, to tension the belt, to deflect the belt, or to drive the belt.

According to a further advantageous embodiment, the gripping force is ascertained in a torque sensor, wherein the torque sensor is arranged on the gripper drive. If a torque sensor is present on the gripper drive, a standard technical solution can advantageously be used without the additional need for a force sensor. The torque sensor on the gripper drive is based, in particular, on common torque sensors as they are already known from drives of joints of robot manipulators.

According to a further advantageous embodiment, the gripper jaws of the gripper are closed until the gripper jaws contact the object at contact points of the gripper jaws by actuating the gripper drive. The actuation of the gripper drive for closing the gripper jaws until the object comes into contact with the gripper jaws at the contact points of the gripper jaws is carried out, in particular, by a force feedback from the gripper force, wherein the closing of the gripper jaws is particularly advantageously stopped immediately after a contact force of the gripper jaws with the object is determined in order to start the teach-in process with the lowest possible output force.

According to a further advantageous embodiment, the gripper jaws of the gripper are closed until the gripper jaws contact the object at the contact points of the gripper jaws by manually guiding the gripper jaws. This embodiment advantageously allows a particularly intuitive and fast method of teaching in the desired gripper force on the object for the robot system. This is because in the case of this embodiment, the hand of the user, in particular, only needs to perform a single operation to close the gripper jaws against the object and then to apply the desired closing force externally.

According to a further advantageous embodiment, the externally applied desired closing force is a manually applied force.

According to a further advantageous embodiment, the externally applied desired closing force is a force applied by a second gripper of a second robot manipulator.

Another aspect of the invention relates to a robot system to teach in a holding force for holding an object, the system including:

- a robot manipulator including a gripper arranged on the robot manipulator, the gripper having gripper jaws which are elastically deformable in a reversible manner; and
- a computing unit configured to:
  - close the gripper until the gripper jaws contact the object at contact points of the gripper jaws;
  - externally apply a desired closing force at connection points of the gripper jaws to gripper jaw bearings, such that the connection points move relative to the contact points, thereby elastically deforming the gripper jaws;
  - actuate a gripper drive in order to maintain a current position of the connection points, such that after termination of the closing force as externally applied onto the connection points, the connection points maintain their current position; and
  - ascertain and store a value of a gripping force or a gripping torque, wherein the gripping force or the gripping torque is produced by the elastic deformation of the gripper jaws and is exerted onto the connection points by the gripper jaws.

Advantages and preferred developments of the proposed robot system can be derived from an analogous and corresponding transfer of the statements made above in connection with the proposed method.

Further advantages, features and details can be derived from the following description, in which—with reference to the drawings, if necessary—at least one embodiment is described in detail. Identical, similar and/or functionally identical parts are denoted with the same reference signs.

The illustrations in the figures are schematic and not to scale.

DETAILED DESCRIPTION

Figure 1:
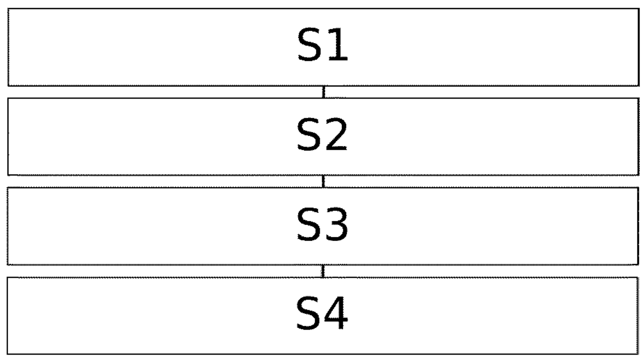
FIG. 1 shows a method for teaching in a holding force for holding an object by a gripper of a robot manipulator according to an embodiment of the invention.

FIG. 1 shows a method for teaching in a holding force for holding an object 9 by a gripper 5 of a robot manipulator 3, the gripper 5 having gripper jaws which can be elastically deformed in a reversible manner 7, the method including:

- closing S1 the gripper 5 until the gripper jaws 7 contact the object 9 at contact points 15 of the gripper jaws 7, wherein the gripper jaws 7 of the gripper 5 are closed until the gripper jaws 7 contact the object 9 at contact points 15 of the gripper jaws 7 by actuating the gripper drive 17,
- externally applying S2 a desired closing force at connection points 13 of the gripper jaws 7 to gripper jaw bearings 11, such that the connection points 13 move relative to the contact points 15, thereby elastically deforming the gripper jaws 7,
- actuating S3 a gripper drive 17 in order to maintain the current position of the connection points 13 and terminating the closing force externally applied onto the connection points 13, and
- ascertaining and storing S4 a value of a gripping force or a gripping torque, wherein the gripping force or the gripping torque is produced by the elastic deformation of the gripper jaws 7 and is exerted onto the connection points 13 by the gripper jaws 7.

Figure 2:
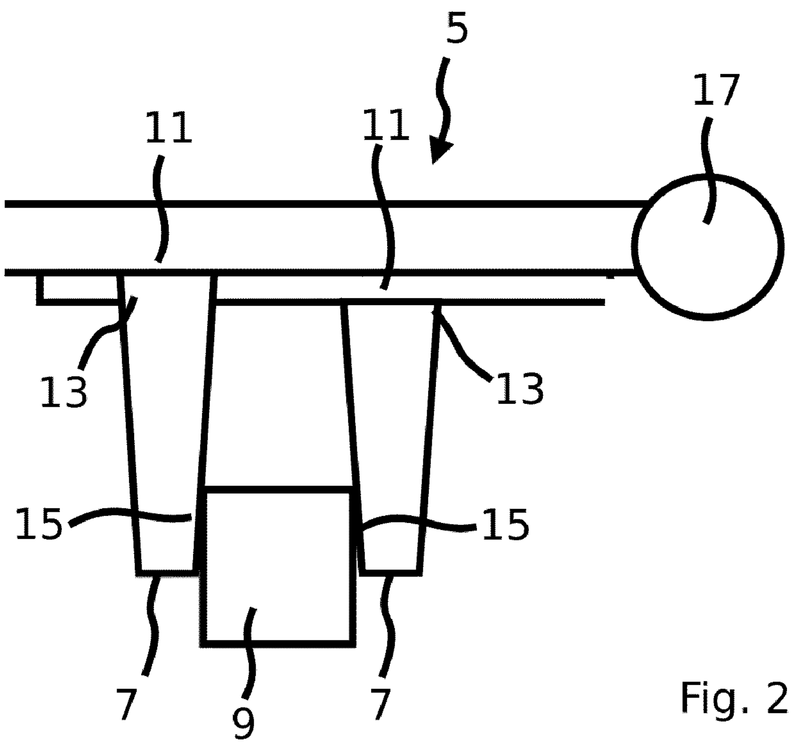
FIG. 2 shows a gripper according to a further embodiment of the invention.

FIG. 2 shows a gripper 5. The gripper 5 has elongated gripper jaws 7 made of plastic. The gripper jaws 7 each have a free end and, opposite thereto, a connection point 13 which is connected to the same belt, albeit on opposite sides of the belt. The belt forms the belt bearings 11, wherein the portion of the belt which is located at the corresponding connection point 13 is referred to as the corresponding belt bearing 11. The gripper jaw bearings 11 are therefore certain portions on the closed belt, and the connection points 13 of the gripper jaws 7 are ends of the gripper jaws 7 on the belt side. The contact points 15 of the gripper jaws 7 with the object 9 are in the region of the free ends of the gripper jaws 7. The belt is driven by a gripper drive 17 on which a torque sensor is also arranged.

Figure 3:
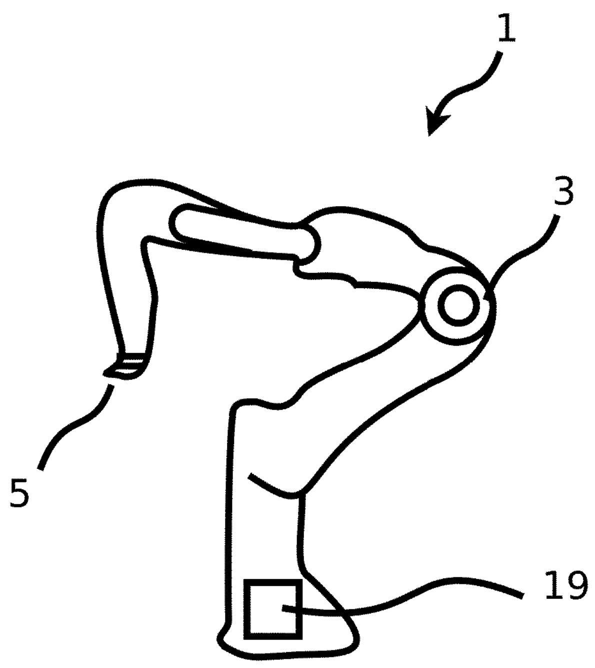
FIG. 3 shows a robot system with a robot manipulator and with a computing unit and with a gripper arranged on the robot manipulator according to a further embodiment of the invention.

FIG. 3 shows a robot system 1 with a robot manipulator 3 and with a computing unit 19 and with a gripper 5 arranged on the robot manipulator 3, as shown in FIG. 2. The robot system 1 is used to teach in a holding force for holding an object 9 using the gripper 5 of the robot manipulator 3. The gripper 5 has gripper jaws 7 made of plastic which can be fully elastically deformed in a reversible manner. The computing unit 19 of the robot manipulator 3 is designed, after an external application of a desired closing force at connection points 13 of the gripper jaws 7 to gripper jaw bearings 11, such that the connection points 13 move relative to the contact points 15, thereby elastically deforming the gripper jaws 7, to actuate a gripper drive 17 in order to maintain the current position of the connection points 13, such that, after the termination of the external force applied to the connection points 13, the connection points 13 maintain their position. Furthermore, the computing unit 19 is designed to ascertain and store a value of a gripping force or a gripping torque, wherein the gripping force or the gripping torque is produced by the elastic deformation of the gripper jaws 7 and is exerted onto the connection points 13 by the gripper jaws 7.

Even though the invention has been illustrated and explained in greater detail via preferred embodiments, the invention is not limited by the disclosed examples, and other variations can be derived therefrom by a person skilled in the art without departing from the scope of protection of the invention. It is therefore clear that there is a plurality of possible variations. It is also clear that embodiments mentioned by way of example actually only constitute examples that are not to be interpreted in any way as a limitation of the scope of protection, of the potential applications, or of the configuration of the invention. Instead, the preceding description and the description of the figures allow a person skilled in the art to specifically implement the example embodiments, wherein a person skilled in the art, having knowledge of the disclosed inventive concept, is able to make numerous modifications, for example, with respect to the function or the arrangement of individual elements mentioned in an embodiment, without departing from the scope of protection, which is defined by the claims and their legal equivalents, such as a further explanation in the description.

LIST OF REFERENCE NUMERALS

1 Robot system
3 Robot manipulator
5 Gripper
7 Gripper jaws
9 Object
11 Gripper jaw bearings
13 Connection points
15 Contact points
17 Gripper drive
19 Processing unit
S1 Closing
S2 Externally applying
S3 Actuating
S4 Ascertaining and storing

The invention claimed is:

1. A method of teaching in a holding force for holding an object by a gripper of a robot manipulator, wherein the gripper has gripper jaws which are elastically deformable in a reversible manner, wherein the gripper jaws are rigid bodies with portions at their connection points formed by reversibly deformable material formed as a spring, the method comprising:

- closing the gripper until the gripper jaws contact the object at contact points of the gripper jaws;
- receiving an external closing force manually applied by a user at connection points of the gripper jaws to gripper jaw bearings, such that the connection points move relative to the contact points, thereby producing elastic deformation of the gripper jaws that provides direct tactile feedback of the external closing force to the user;
- actuating a gripper drive in order to maintain a current position of the connection points, such that after termination of the external closing force as manually applied by the user onto the connection points, the connection points maintain their current position, wherein at the moment when the application of the external closing force onto the connection points of the gripper jaws is terminated, the externally applied closing force is replaced by the holding force of the gripper drive for holding the gripper jaw bearings together with the connection points against the spring force of the gripper jaws, wherein neither the connection points nor other components of the overall system move;

ascertaining and storing a value of a gripping force or a gripping torque, wherein the gripping force or the gripping torque is produced by the elastic deformation of the gripper jaws and is exerted onto the connection points by the gripper jaws; and wherein the gripper jaws provide direct tactile feedback of the gripping torque produced by the elastic deformation of the gripper jaws relative to the contact points of the object so that the gripping force to hold the object is taught in as a result of the user feeling the manually applied closing force of the gripper jaws on the object via the direct tactile feedback, wherein the gripping force is ascertained in a torque sensor, the torque sensor being arranged on the gripper drive.

2. The method according to claim 1, wherein the gripper jaw bearings are portions on a closed belt, and the connection points of the gripper jaws are belt-side ends of the gripper jaws, and wherein the contact points of the gripper jaws with the object are within a region of free ends of the gripper jaws.

3. The method according to claim 2, wherein the gripping force is ascertained in a force sensor, the force sensor ascertaining a force applied to the belt.

4. The method according to claim 2, wherein the gripping force is ascertained in a torque sensor, the torque sensor being arranged on a pulley.

5. The method according to claim 1, wherein closing the gripper jaws of the gripper until the gripper jaws contact the object at contact points of the gripper jaws takes place by actuating the gripper drive.

6. The method according to claim 1, wherein closing the gripper jaws of the gripper until the gripper jaws contact the object at contact points of the gripper jaws takes place by manually guiding the gripper jaws.

7. The method according to claim 1, wherein the manually applied closing force corresponds to the gripping force taught in by the user based on the direct tactile feedback.

8. A robot system to teach in a holding force for holding an object, the system comprising:

a robot manipulator comprising a gripper arranged on the robot manipulator, the gripper having gripper jaws which are elastically deformable in a reversible manner, wherein the gripper jaws are rigid bodies with portions at their connection points formed by reversibly deformable material formed as a spring; and a computing unit configured to:

close the gripper until the gripper jaws contact the object at contact points of the gripper jaws;

receive an external closing force manually applied by a user at connection points of the gripper jaws to gripper jaw bearings, such that the connection points move relative to the contact points, thereby producing elastic deformation of the gripper jaws that provides direct tactile feedback of the external closing force to the user;

actuate a gripper drive in order to maintain a current position of the connection points, such that after termination of the external closing force as manually applied by the user onto the connection points, the connection points maintain their current position, wherein at the moment when the application of the external closing force onto the connection points of the gripper jaws is terminated, the externally applied closing force is replaced by the holding force of the gripper drive for holding the gripper jaw bearings together with the connection points against the spring force of the gripper jaws, wherein neither the connection points nor other components of the overall system move;

ascertain and store a value of a gripping force or a gripping torque, wherein the gripping force or the gripping torque is produced by the elastic deformation of the gripper jaws and is exerted onto the connection points by the gripper jaws; and wherein the gripper jaws provide direct tactile feedback of the gripping torque produced by the elastic deformation of the gripper jaws relative to the contact points of the object so that the gripping force to hold the object is taught in as a result of the user feeling the manually applied closing force of the gripper jaws on the object via the direct tactile feedback, wherein the gripping force is ascertained in a torque sensor, the torque sensor being arranged on the gripper drive.

9. The system according to claim 8, wherein the gripper jaw bearings are portions on a closed belt, and the connection points of the gripper jaws are belt-side ends of the gripper jaws, and wherein the contact points of the gripper jaws with the object are within a region of free ends of the gripper jaws.

10. The system according to claim 9, wherein the gripping force is ascertained in a force sensor, the force sensor ascertaining a force applied to the belt.

11. The system according to claim 9, wherein the gripping force is ascertained in a torque sensor, the torque sensor being arranged on a pulley.

12. The system according to claim 8, wherein closing the gripper jaws of the gripper until the gripper jaws contact the object at contact points of the gripper jaws takes place by actuating the gripper drive.

13. The system according to claim 8, wherein closing the gripper jaws of the gripper until the gripper jaws contact the object at contact points of the gripper jaws takes place by manually guiding the gripper jaws.

14. The method according to claim 8, wherein the manually applied closing force corresponds to the gripping force taught in by the user based on the direct tactile feedback.

15. A robot system to teach in a holding force for holding an object, the system comprising:

a robot manipulator comprising a gripper arranged on the robot manipulator, the gripper having gripper jaws which are elastically deformable in a reversible manner, wherein the gripper jaws are rigid bodies with portions at their connection points formed by reversibly deformable material formed as a spring; and a computing unit configured to:

close the gripper until the gripper jaws contact the object at contact points of the gripper jaws;

receive an external closing force manually applied by a user directly at connection points at a proximal end of the gripper jaws to gripper jaw bearings, such that the connection points move relative to the contact points at a free end of the gripper jaws, thereby producing elastic deformation of the gripper jaws that provides direct tactile feedback of the external closing force to the user;

actuate a gripper drive in order to maintain a current position of the connection points, such that after termination of the external closing force as manually applied by the user onto the connection points, the connection points maintain their current position, wherein at the moment when the application of the external closing force onto the connection points of the gripper jaws is terminated, the externally applied closing force is replaced by the holding force of the gripper drive for holding the gripper jaw bearings together with the connection points against the spring force of the gripper jaws, wherein neither the connection points nor other components of the overall system move;

ascertain and store a value of a gripping force or a gripping torque, wherein the gripping force or the gripping torque is produced by the elastic deformation of the gripper jaws and is exerted onto the connection points by the gripper jaws; and wherein the gripper jaws provide direct tactile feedback of the gripping torque produced by the elastic deformation of the gripper jaws relative to the contact points of the object so that the gripping force to hold the object is taught in as a result of the user feeling the manually applied closing force of the gripper jaws on the object via the direct tactile feedback.

16. The system according to claim 15, wherein the gripping force is ascertained in a torque sensor, the torque sensor being arranged on the gripper drive.

17. The system according to claim 15, wherein the gripper jaw bearings are portions on a closed belt, and the connection points of the gripper jaws are belt-side ends of the gripper jaws.

18. The system according to claim 17, wherein the gripping force is ascertained in a force sensor, the force sensor ascertaining a force applied to the belt.

* * * * *